United States Patent
Jan

(10) Patent No.: US 10,234,148 B2
(45) Date of Patent: Mar. 19, 2019

(54) AIR-CONDITIONING APPARATUS

(71) Applicant: ALTRASON INC., Taipei (TW)

(72) Inventor: Po-Sheng Jan, Taipei (TW)

(73) Assignee: ALTRASON INC., Taipei (TW)

( * ) Notice: Subject to any disclaimer, the term of this patent is extended or adjusted under 35 U.S.C. 154(b) by 352 days.

(21) Appl. No.: 15/360,958

(22) Filed: Nov. 23, 2016

(65) Prior Publication Data

US 2018/0051898 A1 Feb. 22, 2018

(30) Foreign Application Priority Data

Aug. 17, 2016 (TW) .............................. 105126160 A

(51) Int. Cl.
*F24F 3/14* (2006.01)
*B01D 53/06* (2006.01)
(Continued)

(52) U.S. Cl.
CPC ............ *F24F 3/1423* (2013.01); *B01D 53/06* (2013.01); *F24F 3/153* (2013.01); *F24F 7/007* (2013.01); *F24F 7/08* (2013.01); *F24F 11/0001* (2013.01); *F24F 11/70* (2018.01); *F24F 13/10* (2013.01); *F24H 3/022* (2013.01); *F24F 2003/1464* (2013.01); *F24F 2203/1012* (2013.01); *F24F 2203/1032* (2013.01); *F24F 2203/1056* (2013.01); *F24F 2203/1068* (2013.01); *F24F 2203/1096* (2013.01)

(58) Field of Classification Search
CPC ......... F24H 3/022; F24F 11/001; F24F 11/70; F24F 13/10; F24F 3/1423; F24F 3/153; F24F 7/007; F24F 7/08; F24F 2003/1464; F24F 2203/1032; F24F 2203/1056; F24F 2203/1068; F24F 2203/1096; B01D 53/06
USPC .......... 96/124–126; 95/113; 34/472, 473, 80
See application file for complete search history.

(56) References Cited

U.S. PATENT DOCUMENTS 5,709,736 A * 1/1998 Fujimura ............... B01D 53/06
 55/400
9,353,959 B2 * 5/2016 Jan ......................... B01D 53/08
(Continued)

FOREIGN PATENT DOCUMENTS

FR 2851033 A1 * 8/2004 ............. F24F 3/044
JP 2005291654 A * 10/2005 ............ F24F 3/1423
JP 2007225207 A * 9/2007

*Primary Examiner* — Frank M Lawrence, Jr.
(74) *Attorney, Agent, or Firm* — Maschoff Brennan

(57) ABSTRACT

An air conditioning apparatus comprises an inlet module, an airflow guiding module, a hygroscopic wheel a dehumidification heating module and an internal recirculation heating module. The airflow guiding module includes an air channel switching unit, an outflowing air channel in air communication with an external environment outside of an air-conditioning environment, and an inflowing air channel in air communication with the air-conditioning environment. The air conditioning apparatus of the present invention meets various requirements for air conditioning. In addition, when the air conditioning apparatus performs a dehumidification process, the hygroscopic wheel and the dehumidification heating module is applied to remove the moisture of the air conditioning flow of the inflowing air channel, and thus the relative humidity of the air-conditioning environment is directly reduced so as to increase the dehumidifying efficiency.

12 Claims, 8 Drawing Sheets

(51) Int. Cl.

| | |
|---|---|
| *F24H 3/02* | (2006.01) |
| *F24F 3/153* | (2006.01) |
| *F24F 7/007* | (2006.01) |
| *F24F 7/08* | (2006.01) |
| *F24F 11/00* | (2018.01) |
| *F24F 13/10* | (2006.01) |
| *F24F 11/70* | (2018.01) |

(56) References Cited

U.S. PATENT DOCUMENTS

2008/0003940 A1* 1/2008 Haglid ................. F24F 3/14
                                                              454/228
2015/0323202 A1* 11/2015 Jan ..................... B01D 53/08
                                                              96/118

* cited by examiner

AIR-CONDITIONING APPARATUS

FIELD OF THE INVENTION

The present invention relates to an air-conditioning apparatus, and more particularly, to an air-conditioning apparatus which can directly absorb moisture.

BACKGROUND OF THE INVENTION

In order to prevent from outdoor noise pollution, outdoor dirt pollution and own personal privacy, a modern building is usually designed with enclosed space. However, the building with enclosed space will meet a difficulty to expel odor and water vapor from the indoor environment. A research shows that a relative humidity in an environment higher or lower than a range of 40-60%, which is an ideal relative humidity for human body, will form an environmental hotbed for mold, dust mites and bacteria to thus cause bad smell and even an allergic reaction of eye, skin and respiratory tract. Therefore, a common way for solving the problems of odor and the high relative humidity is to install an air conditioner having functions of both ventilation and air-drying in a bathroom where moisture and smell are most often caused.

A conventional air conditioner usually reduces humidity by mechanism which increases the moving rate of water molecules by heating the environmental air to become evaporating moisture. The heated evaporating moisture is then diffused outsides of an environmental space, such as a bathroom, through the slits of the doors, windows so as to reduce the relative humidity of indoor environment. However, the above prior process of dehumidify of the conventional air conditioner can only expel a relative small proportion of moisture through the slits since most of moisture, after evaporated by heating, will condense as water in the environmental space when the moisture contacts an object with lower temperature such as a wall. Then the condensed water will repeatedly evaporate through the same procedures again and again. As a result, the conventional air conditioner is with drawback that the dehumidifying efficiency is poor and the energy-consuming is high.

SUMMARY OF THE INVENTION

Accordingly, one of the objects of the present invention is to provide an air-conditioning apparatus which can directly absorb moisture so as to enhance the dehumidifying efficiency and energy saving.

In order to overcome the technical problems in prior art, the present invention provides an air conditioning apparatus that performs an air conditioning process for an air-conditioning environment outside of the air conditioning apparatus, wherein an air conditioning internal space is provided within the air conditioning apparatus, and the air conditioning apparatus comprising:

an inlet module including an air inlet and an inlet fan, wherein the air inlet is in air communication with the air-conditioning environment, and the inlet fan draws an air conditioning flow from the air-conditioning environment to flow through the air inlet into the air conditioning internal space;

an airflow guiding module including an air channel switching unit, an outflowing air channel in air communication with an external environment outside of the air-conditioning environment, and an inflowing air channel in air communication with the air-conditioning environment, wherein the air channel switching unit is provided between the air conditioning internal space and the outflowing air channel, and the air channel switching unit is provided between the air conditioning internal space and the inflowing air channel, the air channel switching unit is configured to guide the air conditioning flow of the air conditioning internal space to the inflowing air channel and/or to the outflowing air channel so as to guide the air conditioning flow to the air-conditioning environment and/ or guide the air conditioning flow to the external environment;

a hygroscopic wheel provided on the inflowing air channel, wherein the hygroscopic wheel absorbs moisture of the air conditioning flow which is guided to the inflowing air channel through air conditioning internal space when the hygroscopic wheel is operated;

a dehumidification heating module which is in thermal communication with the hygroscopic wheel, wherein the dehumidification heating module heats the hygroscopic wheel to evaporate the moisture absorbed within the hygroscopic wheel when the dehumidification heating module is operated; and an internal recirculation heating module which is in thermal communication with the inflowing air channel, wherein the internal recirculation heating module heats the air conditioning flow which is guided to the inflowing air channel when the internal recirculation heating module is operated, wherein when the air conditioning apparatus performs an external air expelling process, the airflow guiding module is configured to guide the air conditioning flow of the air conditioning internal space to the outflowing air channel so as to expel the air conditioning flow of the air conditioning internal space to the external environment through the outflowing air channel;

when the air conditioning apparatus performs a dehumidification process, the airflow guiding module is configured to guide the air conditioning flow of the air conditioning internal space to the inflowing air channel, and to enable the hygroscopic wheel and the dehumidification heating module to be operated so as to dehumidify the air conditioning flow of the inflowing air channel and then guide the dehumidified air to the air-conditioning environment, where the air conditioning flow to be dehumidified is from the air-conditioning environment;

when the air conditioning apparatus performs an internal air circulating process, the airflow guiding module is configured to guide the air conditioning flow of the air conditioning internal space to the inflowing air channel, and not to enable the hygroscopic wheel and the dehumidification heating module to be operated so as to guide the air conditioning flow of the inflowing air channel to the air-conditioning environment without being heated within the inflowing air channel; and when the air conditioning apparatus performs an air heating process, the airflow guiding module is configured to guide the air conditioning flow of the air conditioning internal space to the inflowing air channel, and to enable the internal recirculation heating module to be operated so as to guide the air conditioning flow of the inflowing air channel to the air-conditioning environment.

According to one embodiment of the present invention, the inlet fan is a centrifugal blower, and the inlet module includes two air inlets provided on both sides of a rotation axis of the centrifugal blower.

According to one embodiment of the present invention, the inlet module is configured to switch among three airflow guiding positions including an airflow guiding position that guides the air conditioning flow of the air conditioning internal space to the outflowing air channel, an airflow guiding position that guides the air conditioning flow of the air conditioning internal space to the inflowing air channel, and an airflow guiding position that synchronously guides the air conditioning flow of the air conditioning internal space to both the outflowing air channel and the inflowing air channel, wherein when the air conditioning apparatus performs an air-dry process, the airflow guiding module is configured to synchronously guide the air conditioning flow of the air conditioning internal space to both the outflowing air channel and the inflowing air channel, the internal recirculation heating module is enabled so as to heat the air conditioning flow of the inflowing air channel and then guide the heated air to the air-conditioning environment, and to directly expel the air conditioning flow of the outflowing air channel to the external environment.

According to one embodiment of the present invention, the air channel switching unit includes a rotating disk which rotates around a center of rotation circle and provides with a communication hole and an air-blocking portion, the communication hole and the air-blocking portion are respectively located at different positions of rotation angle on the rotating disk, the positions of the communication hole and the air-blocking portion are simultaneously changed by rotating the rotating disk, and the air conditioning internal space is in a status of air communication with the outflowing air channel through the communication hole so as to guide the air conditioning flow to the outflowing air channel or in a status of not air-communicating with the outflowing air channel by the air-blocking portion so as not to guide the air conditioning flow to the outflowing air channel According to one embodiment of the present invention, the dehumidification heating module includes a dehumidification heater and a steam outlet which are respectively disposed on opposite sides of the hygroscopic wheel and are located corresponding to each other so as to allow the steam generated from the dehumidification heater by heating and evaporating to be discharged to the steam outlet through the hygroscopic wheel, and the steam outlet is in a status of air communication with the external environment through the communication hole by rotating the rotating disk or is in a status of not air-communicating with the air-blocking portion by rotating the rotating disk, by which the positions of the communication hole and the air-blocking portion are simultaneously changed to thus enable or disable the steam outlet to be in air communication with the external environment.

According to one embodiment of the present invention, the dehumidification heating module includes a dehumidification heater and a steam outlet in air communication with the external environment, both of which are respectively disposed on opposite sides of the hygroscopic wheel and are located corresponding to each other so as to allow the steam generated by the dehumidification heater via processes of heating and evaporating to be discharged to the external environment through the hygroscopic wheel and the steam outlet.

According to one embodiment of the present invention, the air conditioning apparatus further comprises a discharge guiding housing, wherein one end of the discharge guiding housing is in air communication with an outlet of the outflowing air channel and the steam outlet, and the other end of the discharge guiding housing is in air communication with the external environment.

According to one embodiment of the present invention, the air channel switching unit includes a rotating disk, which rotates around a center of rotation circle and provides with a communication hole and an air-blocking portion, the communication hole and the air-blocking portion are respectively located at different positions of rotation angle on the rotating disk, the positions of the communication hole and the air-blocking portion are simultaneously changed by rotating the rotating disk, and the air conditioning internal space is in a status of air communication with the communication hole through the steam outlet so as to guide the air conditioning flow to the external environment, or a status of not air-communicating with the external environment by the air-blocking portion so as not to guide the air conditioning flow to the external environment.

According to one embodiment of the present invention, the airflow guiding module includes an arc-shaped position-limiting groove which is concentrically disposed on a rotation axis of the rotation disk, and the rotation disk is provided with a position-limiting bump on a surface of the rotation disk in a position where the surface of the rotation disk faces to the arc-shaped positioning limiting groove, and the arc-shaped position limiting bump is in a sliding operation within the arc-shaped position-limiting groove to thus limit an angular range of the rotational movement of the rotation disk.

According to one embodiment of the present invention, an outlet at the outflowing air channel is provided with a position-limiting sidewall, the rotation disk is provided with a position limiting bump on a surface of the rotation disk in a position where the surface of the rotation disk faces to the outlet at the outflowing air channel, and during the dehumidification process, the position-limiting bump is closely abutted to the position-limiting sidewall to thus limit an angular range of the rotational movement of the rotation disk.

Via the technical means adopted by the present invention, the air conditioning apparatus of the present invention can remove, by performing a dehumidification process of the hygroscopic wheel and the dehumidification heating module, the moisture of the air conditioning flow within the inflowing air channel, and thus directly reduce the relative humidity of the air-conditioning environment so as to have an increased dehumidifying efficiency and further to solve the drawback of high energy-consuming caused by repeated evaporation and condensation of moisture. In addition, the dehumidification heating module of the present invention can directly evaporate the moisture absorbed by the hygroscopic wheel without the necessity of providing an additional drain or emptying water collected in a tank such that it is more convenient. Moreover, the air conditioning apparatus of the present invention integrates a plurality of air-conditioning functions including external air expelling function, dehumidification function, internal air circulating function, and air heating function, by which the plurality of air-conditioning functions are switched by an airflow guiding module. The air conditioning apparatus of the present invention has a compact structure with a space-saving design and is easy to install.

DETAILED DESCRIPTION OF THE PREFERRED EMBODIMENTS

Figure 1:
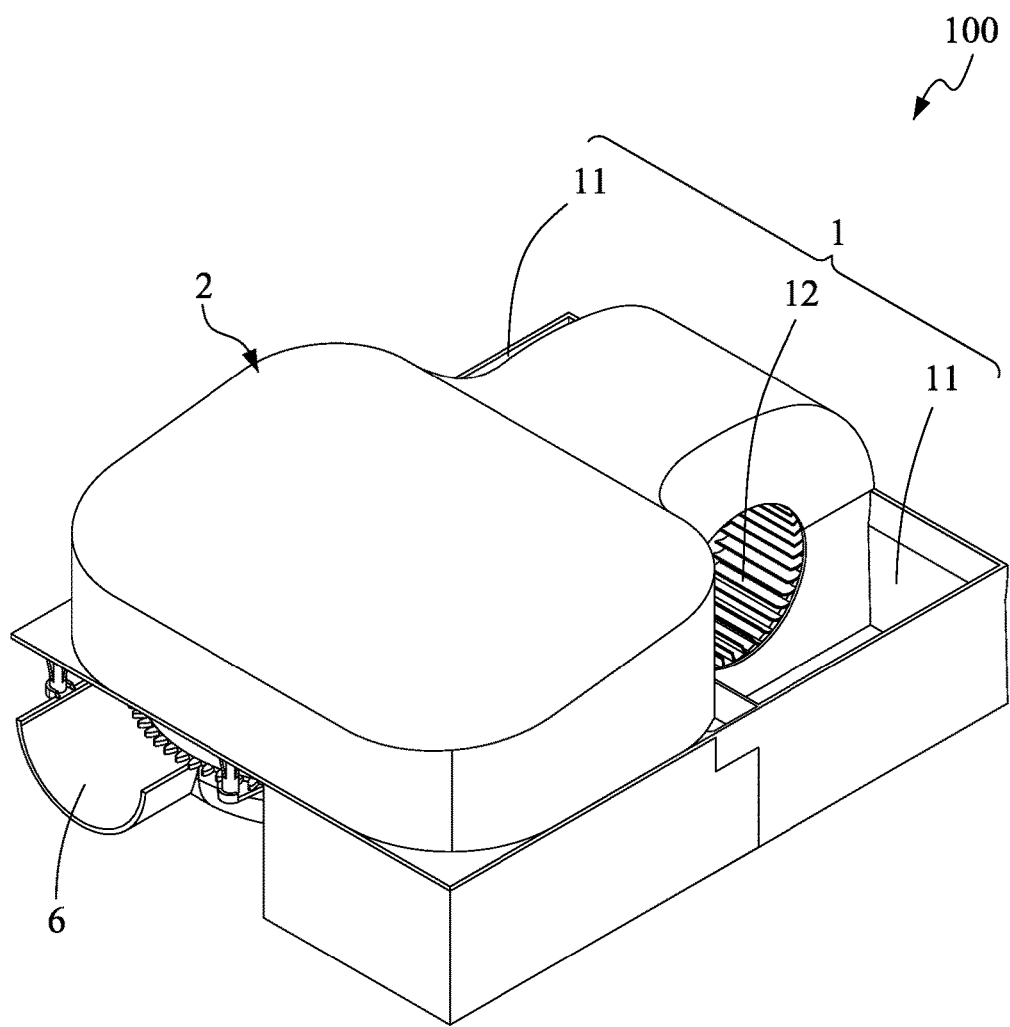
FIG. 1 is a stereogram illustrating an air conditioning apparatus according to one embodiment of the present invention.
Figure 2:
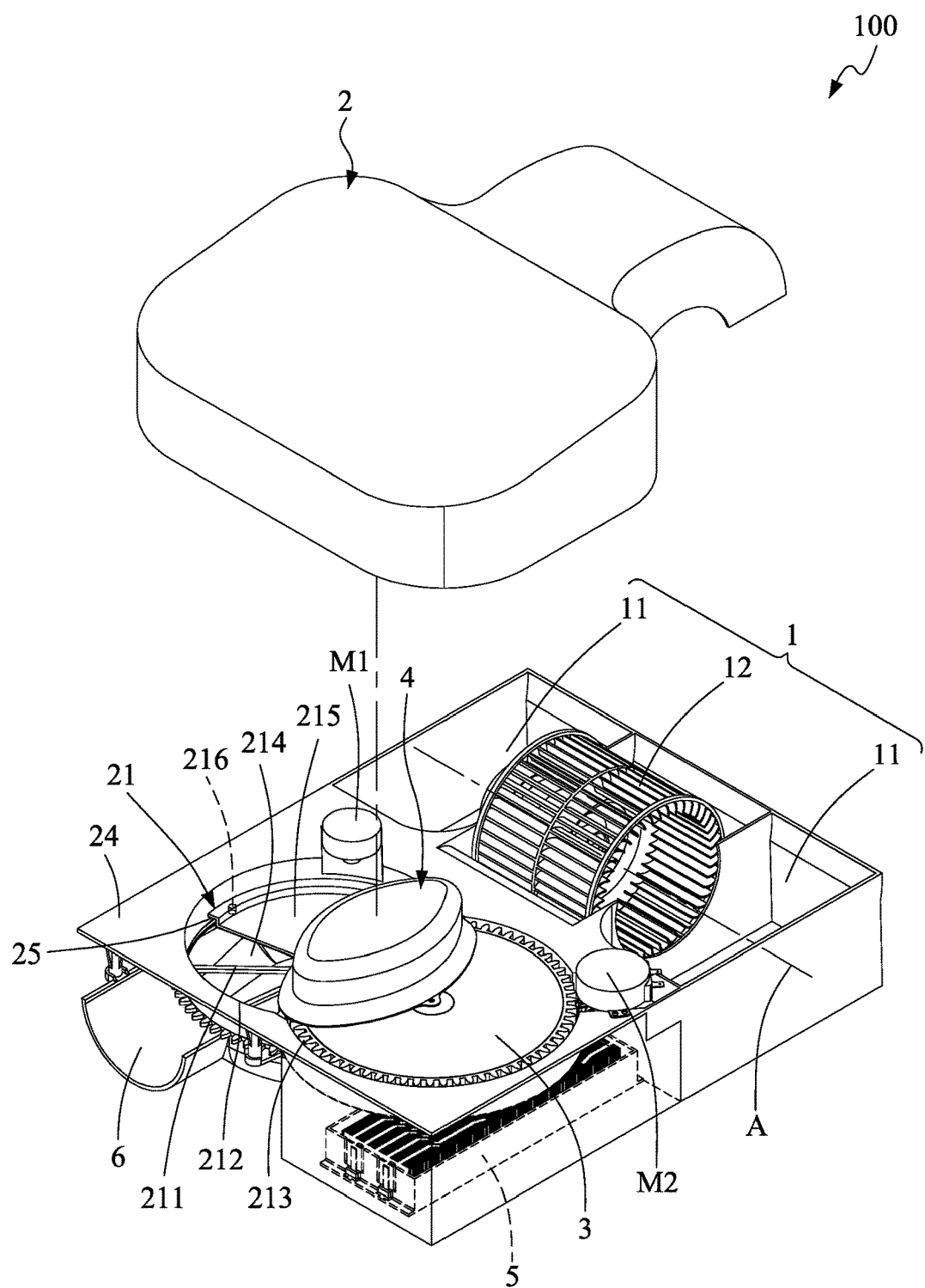
FIG. 2 is a partially exploded view illustrating the air conditioning apparatus according to the embodiment of the present invention.

Embodiments are described in detail below with reference to the FIG. 1 to FIG. 8, and the description is only for explaining the preferred embodiments of the present invention, but not for limiting the implementation of the present invention.

As shown in FIGS. 1 to 4, an air conditioning apparatus 100 according to one embodiment of the present invention performs an air conditioning process for an air-conditioning environment (i.e. an indoor environment) outside of the air conditioning apparatus. The air conditioning apparatus 100 is provided therewithin with an air conditioning internal space S. The air conditioning apparatus 100 comprises:

an inlet module 1 including an air inlet 11 and an inlet fan 12, wherein the air inlet 11 is in air communication with the air-conditioning environment S, and the inlet fan 12 draws an air conditioning flow from the air-conditioning environment S to flow through the air inlet 11 into the air conditioning internal space S;

an airflow guiding module 2 including an air channel switching unit 21, an outflowing air channel 22 in air communication with an external environment outside of the air-conditioning environment, and an inflowing air channel 23 in air communication with the air-conditioning environment, wherein the air channel switching unit 21 is provided between the air conditioning internal space S and the outflowing air channel 22, and the air channel switching unit 21 is provided between the air conditioning internal space S and the inflowing air channel 23, the air channel switching unit 21 is configured to guide the air conditioning flow of the air conditioning internal space S to the inflowing air channel 23 and/or to the outflowing air channel 22 so as to guide the air conditioning flow to the air-conditioning environment and/ or guide the air conditioning flow to the external environment;

a hygroscopic wheel 3 provided on the inflowing air channel 23, wherein the hygroscopic wheel 3 absorbs moisture of the air conditioning flow which is guided to the inflowing air channel 23 through air conditioning internal space S when the hygroscopic wheel 3 is operated;

a dehumidification heating module 4 which is in thermal communication with the hygroscopic wheel 3, wherein the dehumidification heating module 4 heats the hygroscopic wheel 3 to evaporate the moisture absorbed within the hygroscopic wheel 3 when the dehumidification heating module 4 is operated; and an internal recirculation heating module 5 which is in thermal communication with the inflowing air channel 23, wherein the internal recirculation heating module 5 heats the air conditioning flow which is guided to the inflowing air channel 23 when the internal recirculation heating module 5 is operated, wherein when the air conditioning apparatus 100 performs an external air expelling process, the airflow guiding module 2 is configured to guide the air conditioning flow of the air conditioning internal space S to the outflowing air channel 22 so as to expel the air conditioning flow of the air conditioning internal space S to the external environment through the outflowing air channel 22;

when the air conditioning apparatus 100 performs a dehumidification process, the airflow guiding module 2 is configured to guide the air conditioning flow of the air conditioning internal space S to the inflowing air channel 23, and to enable the hygroscopic wheel 3 and the dehumidification heating module 4 to be operated so as to dehumidify the air conditioning flow of the inflowing air channel 23 and then guide the dehumidified air to the air-conditioning environment, where the air conditioning flow to be dehumidified is from the air-conditioning environment;

when the air conditioning apparatus 100 performs an internal air circulating process, the airflow guiding module 2 is configured to guide the air conditioning flow of the air conditioning internal space S to the inflowing air channel 23, and not to enable the hygroscopic wheel 3 and the dehumidification heating module 4 to be operated so as to guide the air conditioning flow of the inflowing air channel 23 to the air-conditioning environment without being heated within the inflowing air channel 23; and when the air conditioning apparatus 100 performs an air heating process, the airflow guiding module 2 is configured to guide the air conditioning flow of the air conditioning internal space S to the inflowing air channel 23, and to enable the internal recirculation heating module to be operated so as to guide the air conditioning flow of the inflowing air channel 23 to the air-conditioning environment.

Specifically, the inlet fan 12 is a centrifugal blower, and the inlet module 1 includes two air inlets 11 provided on both sides of a rotation axis A of the inlet fan 12.

The airflow guiding module 2 includes a casing 24 in which the air conditioning internal space S is provided. The inlet fan 12 draws the air conditioning flow from the air-conditioning environment and flows the air conditioning flow into the air conditioning internal space S along a direction perpendicular to the rotation axis A.

Figure 5:
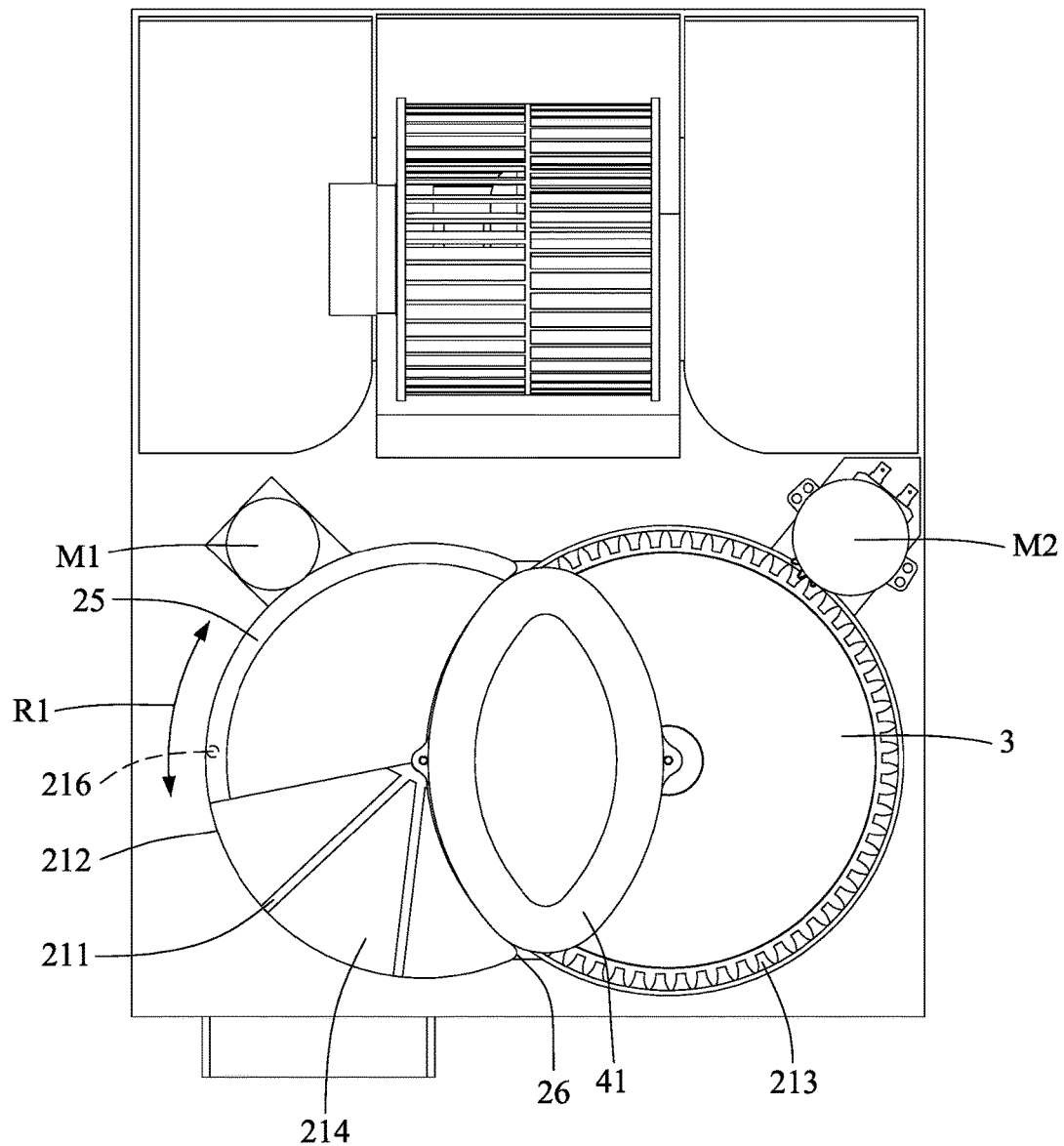
FIG. 5 is a top view of the air conditioning apparatus according to the embodiment of the present invention in an external air expelling process.
Figure 6:
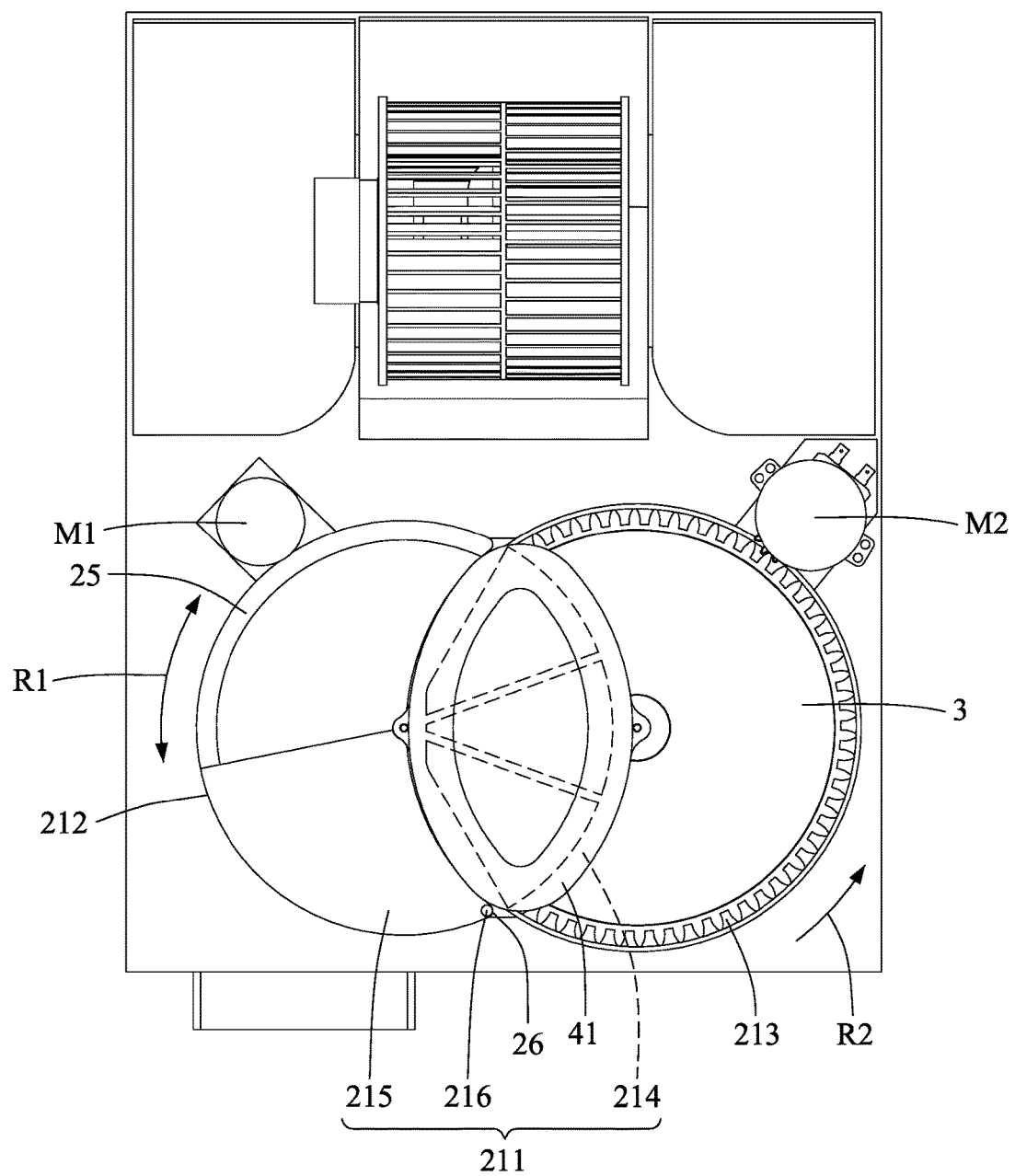
FIG. 6 is a top view of the air conditioning apparatus according to the embodiment of the present invention in a dehumidification process.
Figure 7:
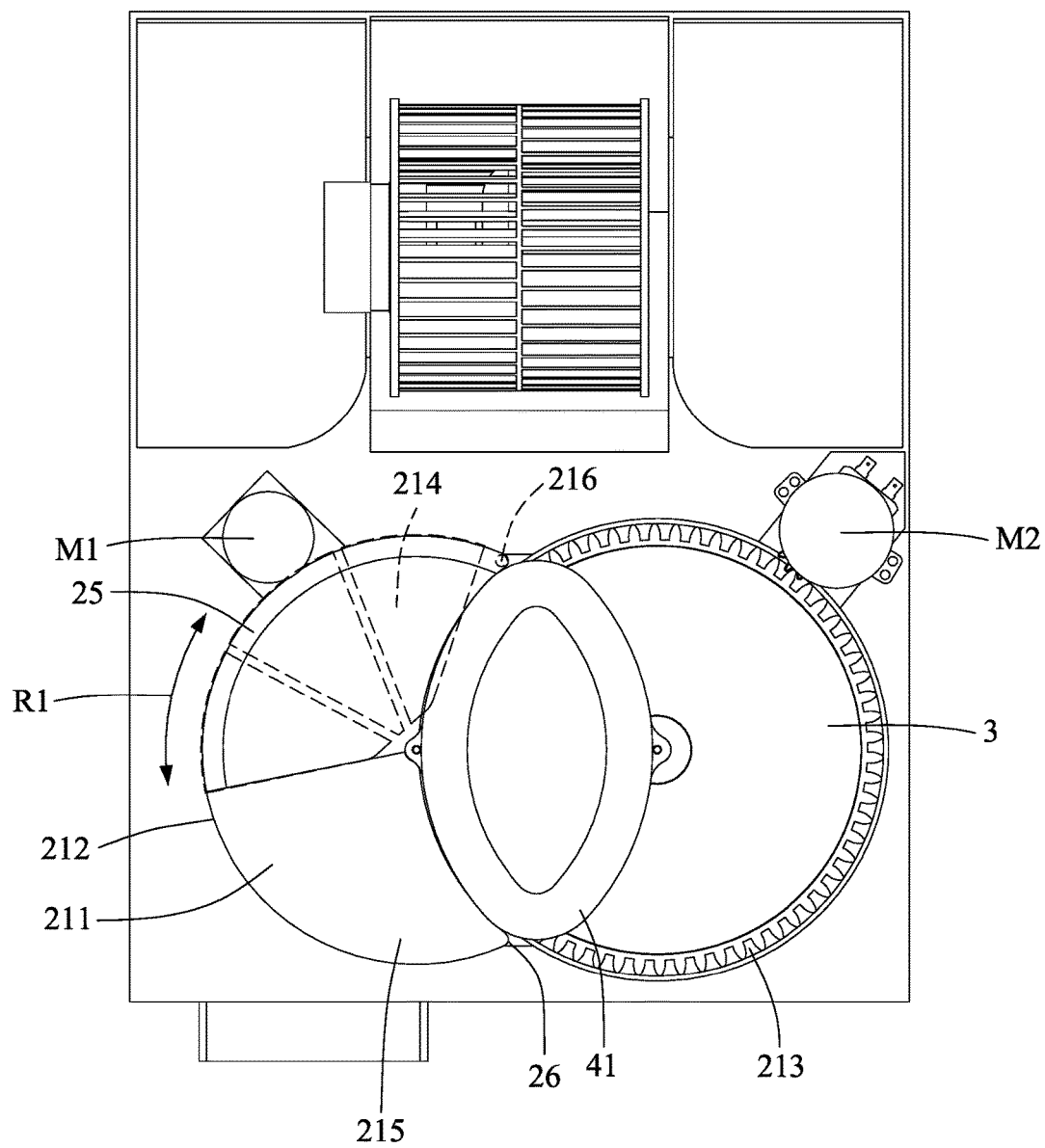
FIG. 7 is a top view of the air conditioning apparatus according to the embodiment of the present invention in an internal air circulating process or an air heating process.

The air channel switching unit 21 includes a rotating disk 211 which rotates around a center of rotation circle and has an opening portion 212 and an inserted portion 213, which are provided at the casing 24. The rotating disk 211, which is driven by a motor M1 to rotate along a rotation direction R1, has a communication hole 214 and an air-blocking portion 215 respectively located at different positions of rotation angle on the rotating disk 211. With rotation of the rotating disk 211, the positions of the communication hole 214 and the air-blocking portion 215 can be simultaneously changed, and thereby the air conditioning internal space S is in a status of being in air communication with the outflowing air channel 22 through the opening portion 212 and the communication hole 214 (as shown in FIG. 5) so as to guide the air conditioning flow to the outflowing air channel 22 or in a status of not being in air-communication with the outflowing air channel 22 by the air-blocking portion 215 (as shown in FIGS. 6 and 7) so as not to guide the air conditioning flow to the outflowing air channel 22. The opening portion 212 is provided at the outflowing air channel 22. The hygroscopic wheel 3 is inserted in the inserted portion 213.

The hygroscopic wheel 3 is driven by a motor M2 to rotate along a rotation direction R2 to absorb the moisture of the air conditioning flow of the air conditioning internal space S. Preferably, the hygroscopic wheel 3 has a plurality of micro pores for achieving a good effect of moisture absorption. For example, the hygroscopic wheel 3 may be made of hygroscopic materials such as zeolite, silica gel, activated alumina and activated carbons.

The dehumidification heating module 4 includes a dehumidification heater 41 and a steam outlet 42, which are respectively disposed on opposite sides of the hygroscopic wheel 3 and are located corresponding to each other, so as to allow the steam generated from the dehumidification heater 41 by heating and evaporating to be discharged to the steam outlet 42 through the hygroscopic wheel 3. The steam outlet 42 is provided corresponding to the rotating disk 211 to enable or disable the steam outlet 42 to be in air communication with the external environment in a manner of being in a status of being in air communication with the external environment through the communication hole 214 or being in a status of not being in air-communication with the air-blocking portion 215 when the positions of the communication hole 214 and the air-blocking portion 215 are simultaneously changed with rotation of the rotating disk 211.

Alternatively, the internal recirculation heating module 5 is a PTC (Positive Temperature Coefficient) heater, which has merits of energy-saving, safety and so on. However, the present invention is not limited to this. The internal recirculation heating module 5 may be other types of heater.

Figure 3:
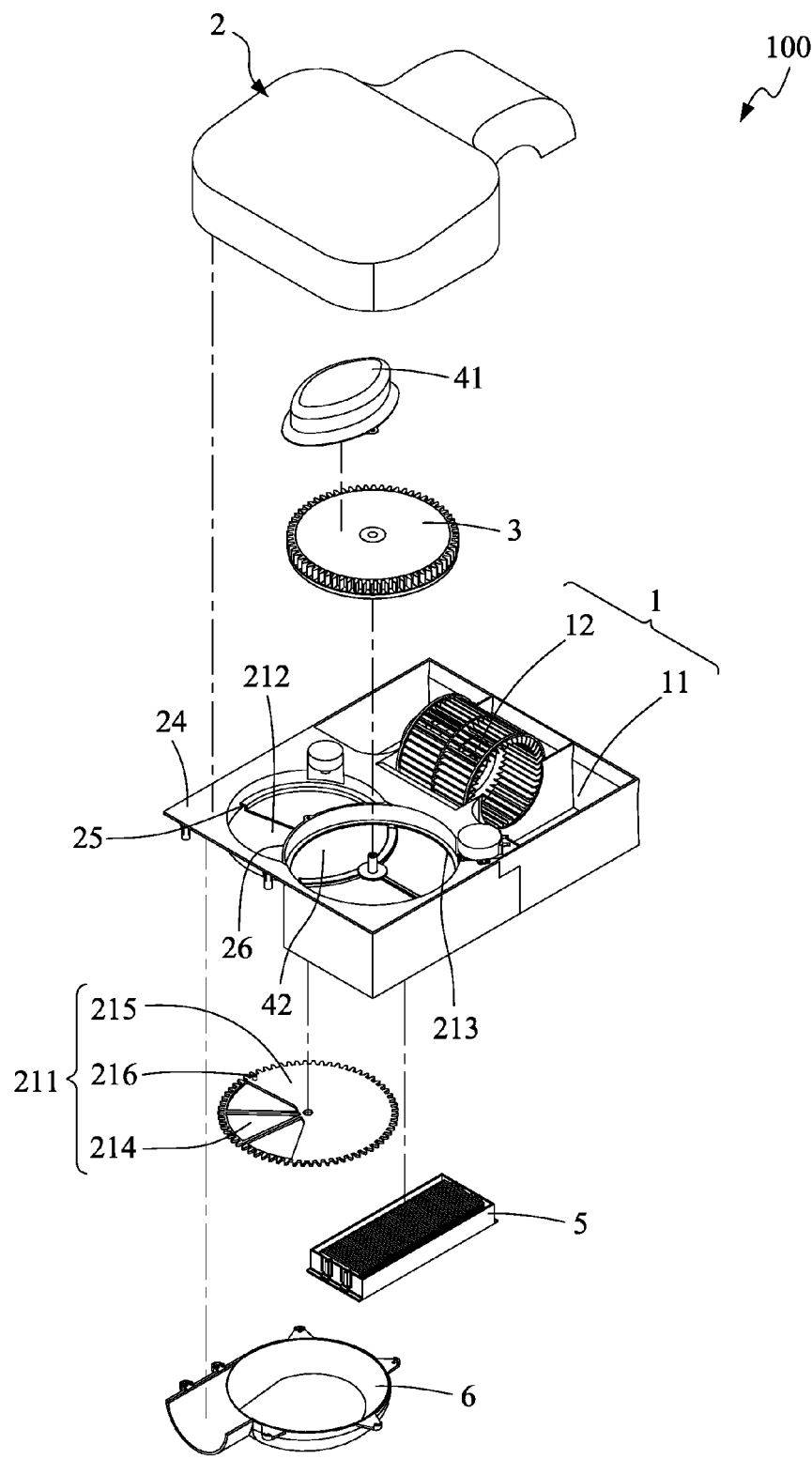
FIG. 3 is an exploded view illustrating the air conditioning apparatus according to the embodiment of the present invention.
Figure 4:
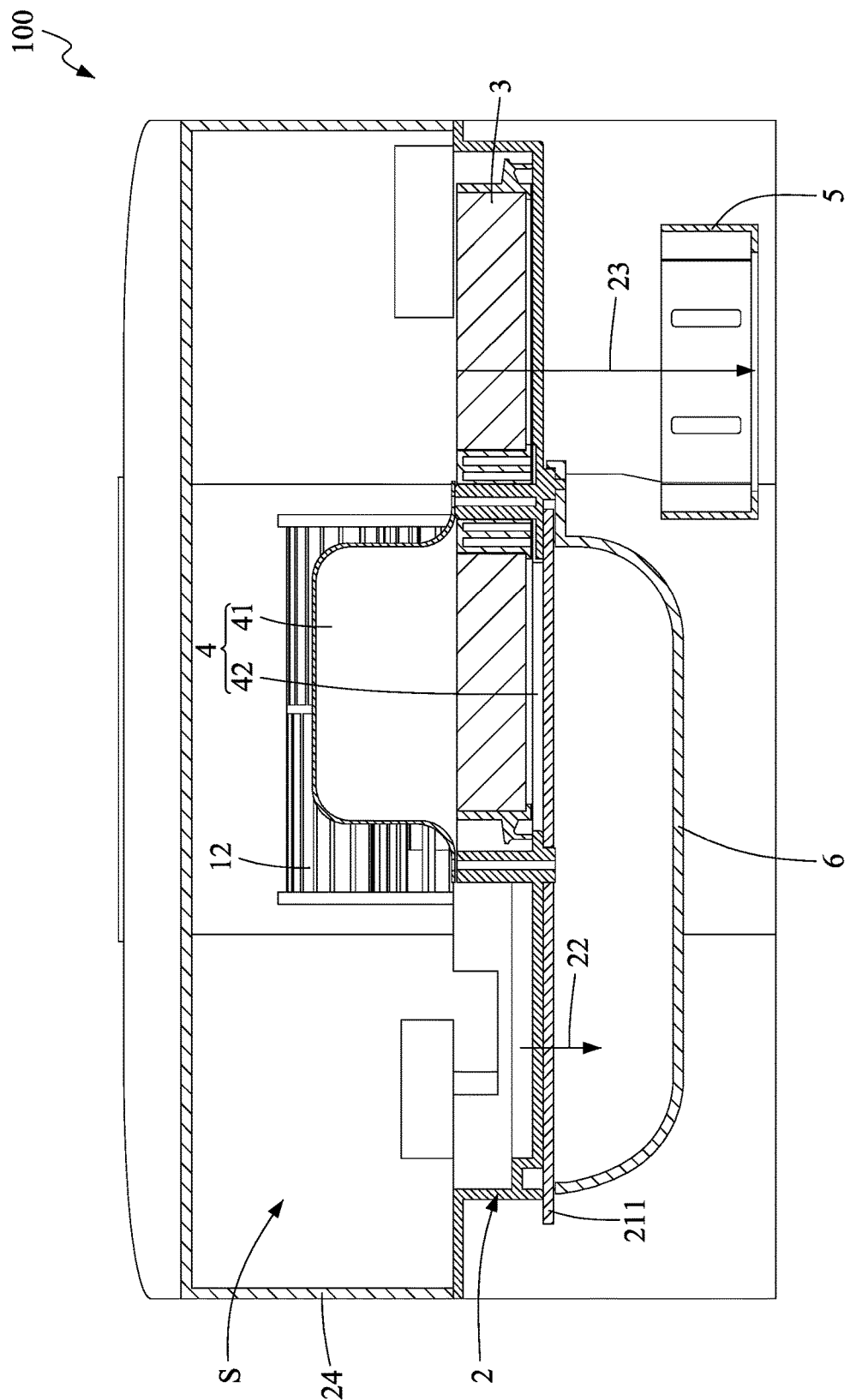
FIG. 4 is a cross-sectional view illustrating the air conditioning apparatus according to the embodiment of the present invention.

As shown in FIGS. 3 and 5, the air conditioning apparatus 100 is configured to, when performing the external air expelling process, switch the airflow guiding module 2 to an airflow guiding position of guiding the air conditioning flow of the air conditioning internal space S to the outflowing air channel 22, and rotate the rotating disk 211 to a position where the communication hole 214 is in air communication with the opening portion 212 and the air-blocking portion 215 is not in air-communicating with the steam outlet 42, thereby directly expelling the air conditioning flow of the air conditioning internal space S to the external environment along the outflowing air channel 22 through the opening portion 212 and the communication hole 214 in sequence so as to perform the external air expelling process.

As shown in FIGS. 3 and 6, the air conditioning apparatus 100 is configured to, when performing the dehumidification process, switch the airflow guiding module 2 to an airflow guiding position of guiding the air conditioning flow of the air conditioning internal space S to the inflowing air channel 23, and rotate the rotating disk 211 to a position where the air-blocking portion 215 is corresponding to the opening portion 212 to disable the air conditioning internal space S from being in air-communication with the outflowing air channel 22 and the communication hole 214 is in air-communication with the steam outlet 42 and the external environment, and enable the dehumidification heating module 4 to operate to remove the moisture absorbed within the hygroscopic wheel 3 by heating the hygroscopic wheel 3 to evaporate the moisture absorbed within the hygroscopic wheel 3 into steam, thereby allowing a portion of the hygroscopic wheel 3 where moisture has been removed to continuously absorb the moisture of air of the air conditioning internal space S, and passing the air having been subjected to moisture absorption by the hygroscopic wheel 3 directly through the micro pores of the hygroscopic wheel 3 to the air-conditioning environment. Accordingly, the relative humidity of the air-conditioning environment can be directly reduced so as to increase the dehumidifying efficiency and further to solve the drawback of high energy-consuming due to the repeated evaporation and condensation of moisture. As shown in FIGS. 3 and 6, the steam generated from the dehumidification heating module 4 by heating and evaporating flows to the steam outlet 42 via the hygroscopic wheel 3 and then flows to the external environment via the communication hole 214. The air conditioning apparatus 100 of the present invention can expel steam to the external environment without a necessity of providing an additional drain or emptying water collected in a tank so as to have an increased the usability.

As shown in FIGS. 1 to 4, preferably, the air conditioning apparatus 100 further includes a discharge guiding housing 6. One end of the discharge guiding housing 6 is in air communication with an outlet of the outflowing air channel 22 and the steam outlet 42, and the other end of the discharge guiding housing 6 is in air communication with the external environment, and thereby the air conditioning flow from the outflowing air channel 22 and the steam from the steam outlet 42 can be collectively expelled to the external environment.

As shown in FIGS. 3 and 7, the air conditioning apparatus 100 is configured to, when performing an internal air circulating process, stop the operation of the internal recirculation heating module 5, switch the airflow guiding module 2 to an airflow guiding position of the air conditioning flow. In the airflow guiding position, the rotating disk 211 rotates to make the air-blocking portion 215 corresponds to the opening portion 212 and the steam outlet 42 to disable the air conditioning internal space S from being in air-communication with the outflowing air channel 22 and the steam outlet 42, and thereby the air conditioning flow of the air conditioning internal space S certainly flows to the air-conditioning environment through the hygroscopic wheel 3 and the internal recirculation heating module 5. In addition, the air conditioning apparatus 100, when performing the air heating process, switches the rotating disk 211 to the same position as the position for the internal air circulating process, enable the internal recirculation heating module 5 to operate the air conditioning flow of, and thereby the flow from the air conditioning internal space S can certainly pass through the hygroscopic wheel 3 and then, after being heated by the internal recirculation heating module 5, flow to the air-conditioning environment.

Preferably, the airflow guiding module 2 includes an arc-shaped position-limiting groove 25 and a position-limiting sidewall 26. The arc-shaped position-limiting groove 25 is concentrically disposed on a rotation axis of the rotation disk 211. The rotation disk 211 is provided with a position-limiting bump 216 at a surface thereof facing the arc-shaped positioning limiting groove 25 and the position-limiting sidewall 26, and the arc-shaped position limiting bump 216 is slidable in the arc-shaped position-limiting groove 25. As shown in FIG. 7, when the rotation disk 211 rotates to a position where the air conditioning internal space S is not in air communication with the outflowing air channel 22 and the steam outlet 42, the arc-shaped position limiting bump 216 closely abuts to a closed end of the arc-shaped position-limiting groove 25 so as to limit an angular range of the rotational movement of the rotation disk 211. As shown in FIG. 6, the position-limiting sidewall 26 is provided at the opening portion 212 and close to an exit of the outflowing air channel 22. During the dehumidification process, the arc-shaped position limiting bump 216 closely abuts to the position-limiting sidewall 26 to thus limit the angular range of the rotational movement of the rotation disk 211.

Figure 8:
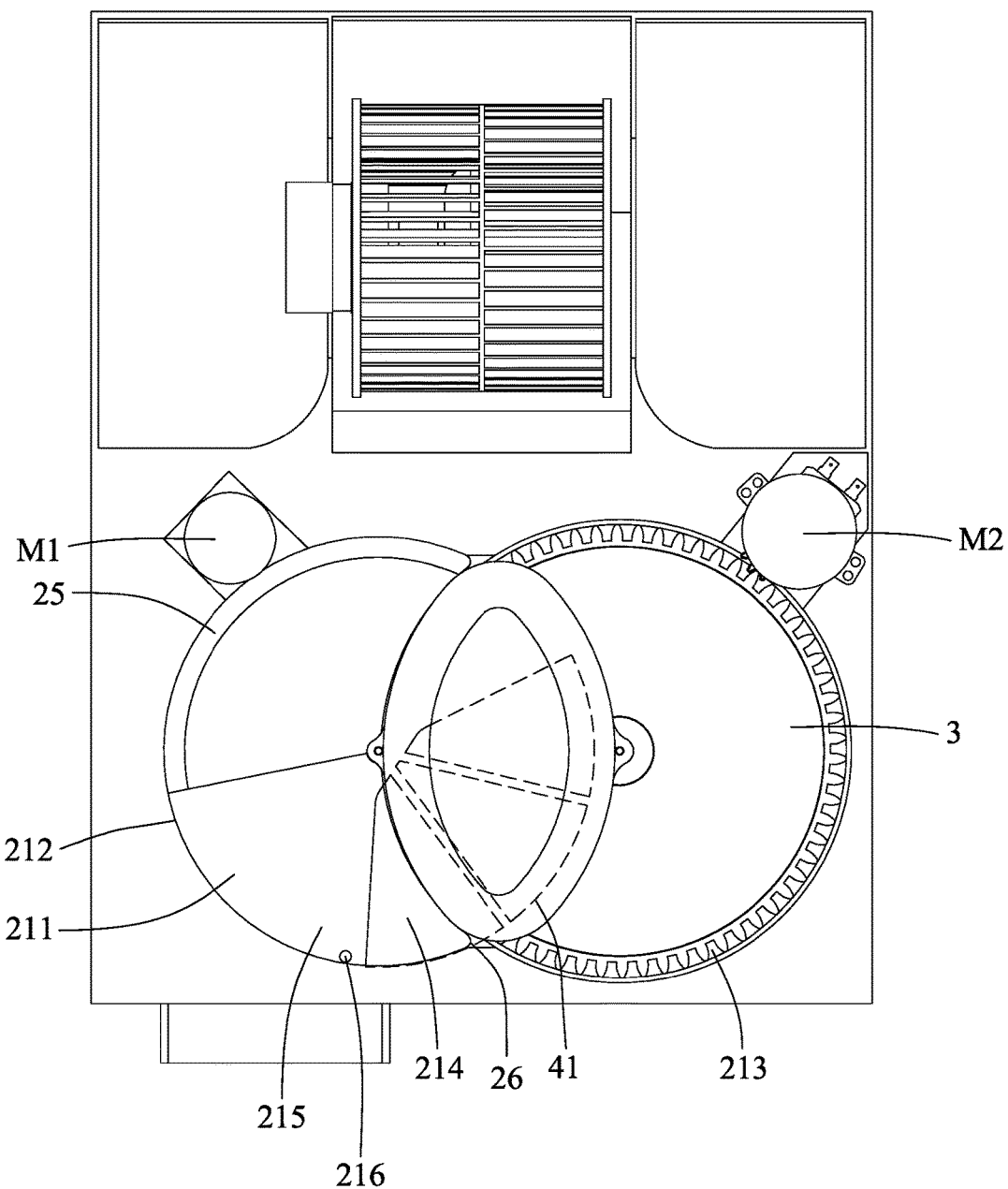
FIG. 8 is a top view of the air conditioning apparatus according to the embodiment of the present invention in an air-dry process.

As shown in FIGS. 3 and 8, the air conditioning apparatus 100 is configured to, when performing an air-dry process, switch the airflow guiding module 2 to a position of synchronously guiding the air conditioning flow of the air conditioning internal space S to both the outflowing air channel 22 and the inflowing air channel 23, and enable the internal recirculation heating module 5 to operate, thereby one portion of the air conditioning flow of the inflowing air channel can be heated and then be guided to the air-conditioning environment, and another portion of the air conditioning flow of the outflowing air channel can be directly guided to the external environment so as to slowly reduce the relative humidity of the air-conditioning environment.

The above are the preferred possible embodiments of the present invention, which are not intended to limit the scope of right of the present invention, so the equivalent structural changes according to the content of the specification and the drawings of the present invention are considered to be included within the scope of right of the present invention.

What is claimed is:

1. An air conditioning apparatus that performs an air conditioning process for an air-conditioning environment outside of the air conditioning apparatus, wherein an air conditioning internal space is provided within the air conditioning apparatus, and the air conditioning apparatus being characterized in that it comprises:
   an inlet module including an air inlet and an inlet fan, wherein the air inlet is in air communication with the air-conditioning environment, and the inlet fan draws an air conditioning flow from the air-conditioning environment to flow through the air inlet into the air conditioning internal space,
   an airflow guiding module including an air channel switching unit, an outflowing air channel in air communication with an external environment outside of the air-conditioning environment, and an inflowing air channel in air communication with the air-conditioning environment, wherein the air channel switching unit is provided between the air conditioning internal space and the outflowing air channel, and the air channel switching unit is provided between the air conditioning internal space and the inflowing air channel, the air channel switching unit is configured to guide the air conditioning flow of the air conditioning internal space to the inflowing air channel and/or to the outflowing air channel so as to guide the air conditioning flow to the air-conditioning environment and/ or guide the air conditioning flow to the external environment;
   a hygroscopic wheel provided on the inflowing air channel, wherein the hygroscopic wheel absorbs moisture of the air conditioning flow which is guided to the inflowing air channel through air conditioning internal space when the hygroscopic wheel is operated;
   a dehumidification heating module which is in thermal communication with the hygroscopic wheel, wherein the dehumidification heating module heats the hygroscopic wheel to evaporate the moisture absorbed within the hygroscopic wheel when the dehumidification heating module is operated; and
   an internal recirculation heating module which is in thermal communication with the inflowing air channel, wherein the internal recirculation heating module heats the air conditioning flow which is guided to the inflowing air channel when the internal recirculation heating module is operated,
   wherein
   when the air conditioning apparatus performs an external air expelling process, the airflow guiding module is configured to guide the air conditioning flow of the air conditioning internal space to the outflowing air channel so as to expel the air conditioning flow of the air conditioning internal space to the external environment through the outflowing air channel,
   when the air conditioning apparatus performs a dehumidification process, the airflow guiding module is configured to guide the air conditioning flow of the air conditioning internal space to the inflowing air channel, and to enable the hygroscopic wheel and the dehumidification heating module to be operated so as to dehumidify the air conditioning flow of the inflowing air channel and then guide the dehumidified air to the air-conditioning environment, where the air conditioning flow to be dehumidified is from the air-conditioning environment;
   when the air conditioning apparatus performs an internal air circulating process, the airflow guiding module is configured to guide the air conditioning flow of the air conditioning internal space to the inflowing air channel, and not to enable the hygroscopic wheel and the dehumidification heating module to be operated so as to guide the air conditioning flow of the inflowing air channel to the air-conditioning environment without being heated within the inflowing air channel, and
   when the air conditioning apparatus performs an air heating process, the airflow guiding module is configured to guide the air conditioning flow of the air conditioning internal space to the inflowing air channel, and to enable the internal recirculation heating module to be operated so as to guide the air conditioning flow of the inflowing air channel to the air-conditioning environment.

2. The air conditioning apparatus of claim 1, wherein the inlet fan is a centrifugal blower, and the inlet module includes two air inlets provided on both sides of a rotation axis of the centrifugal blower.

3. The air conditioning apparatus of claim 1, wherein the inlet module is configured to switch among three airflow guiding positions including
   an airflow guiding position that guides the air conditioning flow of the air conditioning internal space to the outflowing air channel,
   an airflow guiding position that guides the air conditioning flow of the air conditioning internal space to the inflowing air channel, and
   an airflow guiding position that synchronously guides the air conditioning flow of the air conditioning internal space to both the outflowing air channel and the inflowing air channel, wherein when the air conditioning apparatus performs an air-dry process, the airflow guiding module is configured to synchronously guide the air conditioning flow of the air conditioning internal space to both the outflowing air channel and the inflowing air channel, the internal recirculation heating module is enabled so as to heat the air conditioning flow of the inflowing air channel and then guide the heated air conditioning flow to the air-conditioning environment, and to directly expel the air conditioning flow of the outflowing air channel to the external environment.

4. The air conditioning apparatus of claim 1, wherein the air channel switching unit includes a rotating disk which rotates around a center of rotation circle and provides with a communication hole and an air-blocking portion, the communication hole and the air-blocking portion are respectively located at different positions of rotation angle on the rotating disk, the positions of the communication hole and the air-blocking portion are simultaneously changed by rotating the rotating disk, and the air conditioning internal space is in a status of air communication with the outflowing air channel through the communication hole so as to guide the air conditioning flow to the outflowing air channel or in a status of not air-communicating with the outflowing air channel by the air-blocking portion so as not to guide the air conditioning flow to the outflowing air channel.

5. The air conditioning apparatus of claim 4, wherein the dehumidification heating module includes a dehumidification heater and a steam outlet which are respectively disposed on opposite sides of the hygroscopic wheel and are located corresponding to each other so as to allow the steam generated from the dehumidification heater by heating and evaporating to be discharged to the steam outlet through the hygroscopic wheel, and the steam outlet is in a status of air communication with the external environment through the communication hole by rotating the rotating disk or is in a status of not air-communicating with the air-blocking portion by rotating the rotating disk, by which the positions of the communication hole and the air-blocking portion are simultaneously changed to thus enable or disable the steam outlet to be in air communication with the external environment.

6. The air conditioning apparatus of claim 4, wherein the airflow guiding module includes an arc-shaped position-limiting groove which is concentrically disposed on a rotation axis of the rotation disk, and the rotation disk is provided with a position-limiting bump on a surface of the rotation disk in a position where the surface of the rotation disk faces to the arc-shaped positioning limiting groove, and the arc-shaped position limiting bump is in a sliding operation within the arc-shaped position-limiting groove to thus limit an angular range of the rotational movement of the rotation disk.

7. The air conditioning apparatus of claim 4, wherein an outlet at the outflowing air channel is provided with a position-limiting sidewall, the rotation disk is provided with a position limiting bump on a surface of the rotation disk in a position where the surface of the rotation disk faces to the outlet at the outflowing air channel, and during the dehumidification process, the position-limiting bump is closely abutted to the position-limiting sidewall to thus limit an angular range of the rotational movement of the rotation disk.

8. The air conditioning apparatus of claim 1, wherein the dehumidification heating module includes a dehumidification heater and a steam outlet in air communication with the external environment, both of which are respectively disposed on opposite sides of the hygroscopic wheel and are located corresponding to each other so as to allow the steam generated by the dehumidification heater via processes of heating and evaporating to be discharged to the external environment through the hygroscopic wheel and the steam outlet.

9. The air conditioning apparatus of claim 8, further comprising a discharge guiding housing, wherein one end of the discharge guiding housing is in air communication with an outlet of the outflowing air channel and the steam outlet, and the other end of the discharge guiding housing is in air communication with the external environment.

10. The air conditioning apparatus of in claim 8, wherein the air channel switching unit includes a rotating disk, which rotates around a center of rotation circle and provides with a communication hole and an air-blocking portion, the communication hole and the air-blocking portion are respectively located at different positions of rotation angle on the rotating disk, the positions of the communication hole and the air-blocking portion are simultaneously changed by rotating the rotating disk, and the air conditioning internal space is in a status of air communication with the communication hole through the steam outlet so as to guide the air conditioning flow to the external environment, or a status of not air-communicating with the external environment by the air-blocking portion so as not to guide the air conditioning flow to the external environment.

11. The air conditioning apparatus of claim 10, wherein the airflow guiding module includes an arc-shaped position-limiting groove which is concentrically disposed on a rotation axis of the rotation disk, and the rotation disk is provided with a position-limiting bump on a surface of the rotation disk in a position where the surface of the rotation disk faces to the arc-shaped positioning limiting groove, and the arc-shaped position limiting bump is in a sliding operation within the arc-shaped position-limiting groove to thus limit an angular range of the rotational movement of the rotation disk.

12. The air conditioning apparatus of claim 10, wherein an outlet at the outflowing air channel is provided with a position-limiting sidewall, the rotation disk is provided with a position limiting bump on a surface of the rotation disk in a position where the surface of the rotation disk faces to the outlet at the outflowing air channel, and during the dehumidification process, the position-limiting bump is closely abutted to the position-limiting sidewall to thus limit an angular range of the rotational movement of the rotation disk.

* * * * *